United States Patent
Hayman et al.

(10) Patent No.: US 9,022,168 B2
(45) Date of Patent: May 5, 2015

(54) POWERTRAIN AND STEERING ASSEMBLY LAYOUT

(71) Applicant: GM Global Technology Operations LLC, Detroit, MI (US)

(72) Inventors: Alan W. Hayman, Romeo, MI (US); William A. Bear, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 88 days.

(21) Appl. No.: 13/894,753

(22) Filed: May 15, 2013

(65) Prior Publication Data
US 2014/0338992 A1    Nov. 20, 2014

(51) Int. Cl.
*B60G 11/08* (2006.01)
*B60K 5/00* (2006.01)

(52) U.S. Cl.
CPC ........................................ *B60K 5/00* (2013.01)
USPC ........................................ 180/443; 180/297

(58) Field of Classification Search
CPC ................................. B60G 11/08; B62D 5/04
USPC ........................................ 180/443, 291, 297
See application file for complete search history.

(56) References Cited

U.S. PATENT DOCUMENTS

| 3,426,863 | A | * | 2/1969 | Hanson ......................... | 180/437 |
| 4,817,748 | A | * | 4/1989 | Murata et al. ................ | 180/443 |
| 5,069,306 | A | * | 12/1991 | Inoue et al. ................... | 180/291 |
| 5,078,230 | A |   | 1/1992 | Hasuike |   |
| 5,339,918 | A | * | 8/1994 | Nakayama et al. .......... | 180/292 |

FOREIGN PATENT DOCUMENTS

EP    1637435 A3    3/2006

* cited by examiner

*Primary Examiner* — Joseph Rocca
*Assistant Examiner* — Gabriela C Craciun
(74) *Attorney, Agent, or Firm* — Quinn Law Group, PLLC

(57) ABSTRACT

A vehicle includes an engine assembly configured to power a vehicle. The engine assembly defines a first engine end and a second engine end opposite the first engine end. The first engine end is spaced apart from the second engine end along a first direction. The engine assembly defines a third engine end and a fourth engine end opposite the third engine end. The third engine end is spaced apart from the fourth engine end along a second direction. The second direction is substantially perpendicular to the first direction. The vehicle further includes a steering assembly disposed in close proximity to the engine assembly. The steering assembly includes a steering body disposed closer to the first engine end than to the second engine end.

19 Claims, 2 Drawing Sheets

POWERTRAIN AND STEERING ASSEMBLY LAYOUT

TECHNICAL FIELD

The present disclosure relates to vehicles including powertrain and steering assemblies for minimizing a vehicle radius.

BACKGROUND

Vehicles include a powertrain, which typically includes an engine, such as internal combustion engine, a transmission, and a drivetrain. The internal combustion engine produces drive torque. The transmission transfers drive torque from the engine to the drivetrain. The vehicle may further include a steering assembly configured to steer the vehicle in a desired direction.

SUMMARY

The present disclosure relates to vehicles including powertrain and steering assemblies for minimizing a vehicle turning radius. In an embodiment, the vehicle includes an engine assembly configured to power a vehicle. The engine assembly defines a first engine end and a second engine end opposite the first engine end. The first engine end is spaced apart from the second engine end along a first direction. The engine assembly defines a third engine end and a fourth engine end opposite the third engine end. The third engine end is spaced apart from the fourth engine end along a second direction. The second direction is substantially perpendicular to the first direction. The powertrain assembly further includes a steering assembly disposed in close proximity to the engine assembly. The steering assembly includes a steering body disposed closer to the first engine end than to the second engine end. The steering assembly further includes a rack disposed within the steering body. The rack is configured to move through the steering body along a third direction. The third direction is substantially perpendicular to the first direction and the second direction. The steering assembly further includes a pinion disposed within the steering body. The pinion is meshed with the rack such that the rack is configured to move longitudinally upon rotation of the pinion. The steering assembly further includes a pinion shaft rotationally coupled to the pinion. The pinion shaft defines a first shaft end and a second shaft end opposite the first shaft end. The first shaft end is coupled to the pinion. The first shaft end is disposed closer to the first engine end than to the second engine end. The second shaft end is disposed closer to the second engine end than to the first engine end in order to minimize a vehicle turning radius.

In an embodiment, the steering body may be disposed closer to the fourth engine end than to the third engine end. The pinion shaft may extend from the first engine end to the second engine end. The pinion shaft is disposed closer to the fourth engine end than to the third engine end. The powertrain assembly may further include a drive shaft operatively coupled to the engine assembly. The drive shaft is disposed closer to the first engine end than to the second engine end. The drive shaft is disposed closer to the fourth engine end than to the third engine end. The engine assembly includes a crankshaft, and the drive shaft may be disposed closer to the fourth engine end than the crankshaft. The crankshaft may be disposed closer to the fourth engine end than to the third engine end. The powertrain assembly may further include a power assist unit operatively coupled to the pinion shaft such the power assist unit provides torque assist to the steering assembly. The power assist unit may be disposed adjacent the second shaft end.

In another embodiment, the vehicle includes an engine assembly configured to power a vehicle. The engine assembly includes a crankshaft and defines a first engine end and a second engine end opposite the first engine end. The first engine end is spaced apart from the second engine end along a first direction. The engine assembly defines a third engine end and a fourth engine end opposite the third engine end. The third engine end is spaced apart from the fourth engine end along a second direction. The second direction is substantially perpendicular to the first direction. The powertrain assembly further includes a drive shaft operatively coupled to the engine assembly. The drive shaft is closer to the first engine end than to the second engine end. The vehicle further includes a steering assembly disposed in close proximity to the engine assembly. The steering assembly includes a steering body elongated along a third direction. The third direction is substantially perpendicular to the first direction and the second direction. The steering body is closer to the first engine end than to the second engine end in order to minimize a vehicle turning radius.

In an embodiment, the steering assembly includes a rack disposed within the steering body. The rack is configured to move through the steering body along the third direction. The steering assembly includes a pinion meshed with the rack. The pinion is configured to rotate such that the rack is configured to move longitudinally upon rotation of the pinion. The steering assembly further includes a pinion shaft rotationally coupled to the pinion such that the pinion is configured to rotate upon rotation of the pinion shaft. The pinion shaft is elongated substantially along the second direction and is disposed under the engine assembly. The pinion shaft defines a first shaft end and a second shaft end opposite to the first shaft end. The second shaft end is closer to the second engine end than to the first engine end. The first shaft end is closer to the first engine end than the second engine end. The pinion shaft is closer to the fourth engine end than to the third engine end. The powertrain assembly further includes a power assist unit operatively coupled to the pinion shaft such that the power assist unit is configured to provide torque assist to the pinions shaft. The power assist unit is disposed adjacent the second shaft end.

The present disclosure further relates to methods of manufacturing a vehicle. In an embodiment, the method includes providing an engine assembly configured to power a vehicle. The engine assembly defines a first engine end and a second engine end opposite the first engine end. The first engine end is spaced apart from the second engine end along a first direction. The engine assembly defines a third engine end and a fourth engine end opposite the third engine end. The third engine end is spaced apart from the fourth engine end along a second direction. The second direction is substantially perpendicular to the first direction. The method further includes providing a steering assembly. The steering assembly includes a steering body, a rack disposed within the steering body, a pinion meshed with the rack, and a pinion shaft coupled to the pinion. The method further includes positioning the steering assembly in close proximity to the engine assembly such that the steering body is closer to the first engine end than to the second engine end. In addition, the method includes positioning the pinion shaft closer to the fourth engine end than to the third engine end.

The vehicles described above have a layout that minimizes the horizontal distance from the half shaft to the steering rod joints. In doing so, the vehicle turning radius can be minimized.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
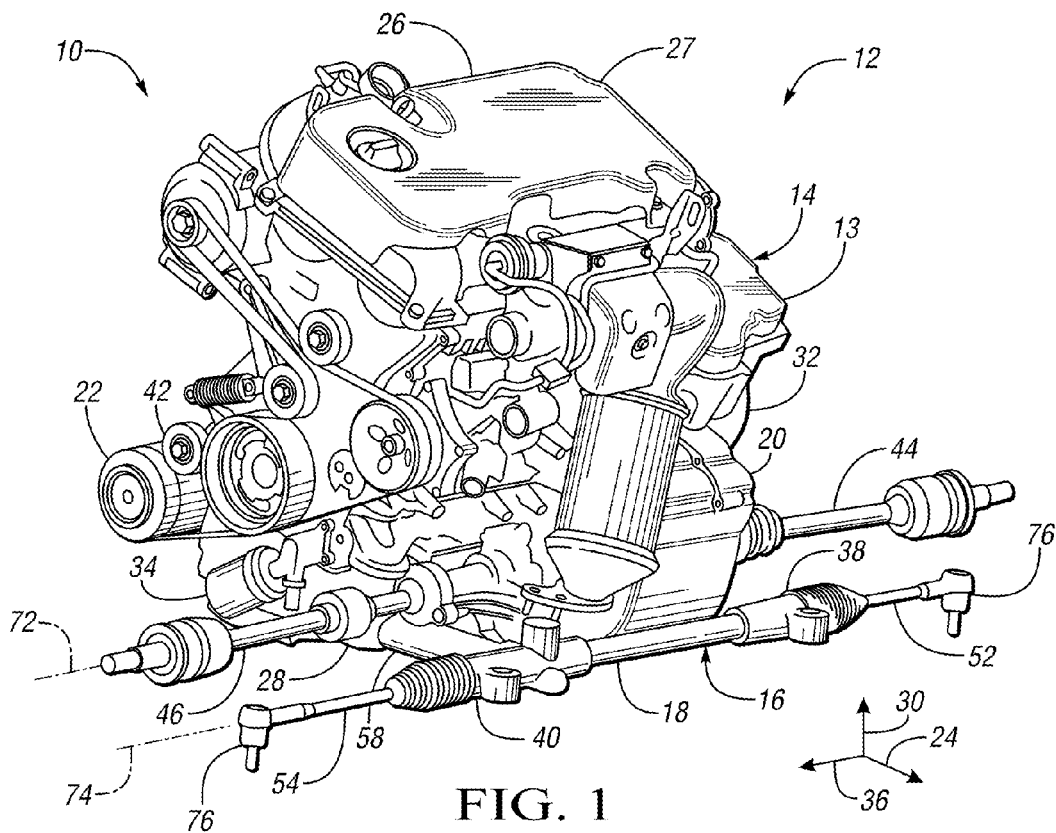
FIG. 1 is a schematic perspective view of a powertrain assembly including an engine assembly and a steering assembly.

Referring to the drawings, wherein like reference numbers refer to like components, FIG. 1 illustrates a part of a vehicle 10 including a powertrain assembly 12, which may have a transverse forward-wheel drive layout. The powertrain assembly 12 includes an engine assembly 13 having an internal combustion engine 14 configured to power the vehicle 10. The engine assembly 13 defines a first or front engine end 20 and a second or rear engine end 22 opposite the first engine end 20. The second engine end 22 is spaced apart from the first engine end 20 along a first direction as indicated by arrow 24. The first engine end 20 is closer to the front (not shown) of the vehicle 10 than the second engine end 22. The engine assembly 13 further defines a third or upper engine end 26 and a fourth or lower engine end 28 opposite the third engine end 26. The fourth engine end 28 is spaced apart from the third engine end 26 along a second direction as indicated by arrow 30. The second direction, which is indicated by arrow 30, may be substantially perpendicular to the first direction, which is indicated by arrow 24. For example, the second direction indicated by arrow 30 may be oriented at an angle ranging between 85 and 95 degrees with respect to the first direction indicated by arrow 24. The third engine end 26 is closer to a hood (not shown) of the vehicle 10 than the fourth engine end 28. The third engine end 26 may be adjacent the cylinder head cover 27. The fourth engine end 28 is adjacent to an oil pan 29 of the internal combustion engine 14. The engine assembly 13 further defines a fifth engine end 32 and a sixth engine end 34 opposite the fifth engine end 32. The sixth engine end 34 is spaced apart from the fifth engine end 32 along a third direction as indicated by arrow 36. The third direction, which is indicated by arrow 36, may be substantially perpendicular to the first direction, which is indicated by arrow 24, and the second direction, which is indicated by arrow 30. For example, the third direction indicated by arrow 36 may be oriented at an angle ranging between 85 and 95 degrees with respect to the first direction indicated by arrow 24 and the second direction indicated by arrow 30. The internal combustion engine 14 includes a crankshaft 42 elongated along the third direction indicated by arrow 36. The crankshaft 42 defines a crankshaft center C (FIG. 2).

Figure 2:
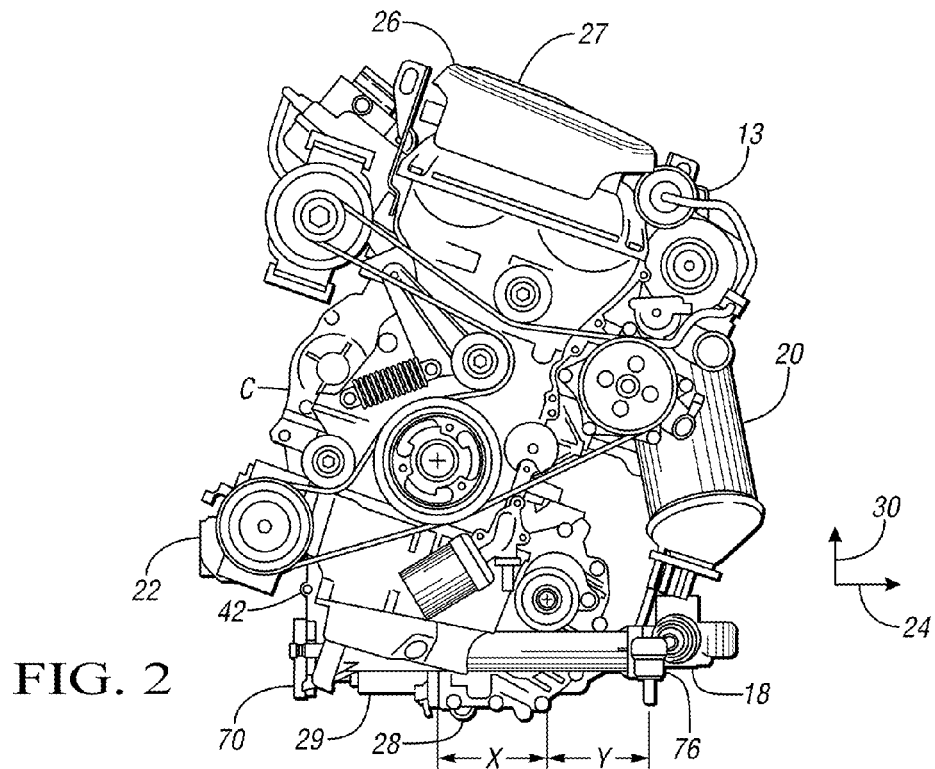
FIG. 2 is a schematic side view of the powertrain assembly shown in FIG. 1.
Figure 3:
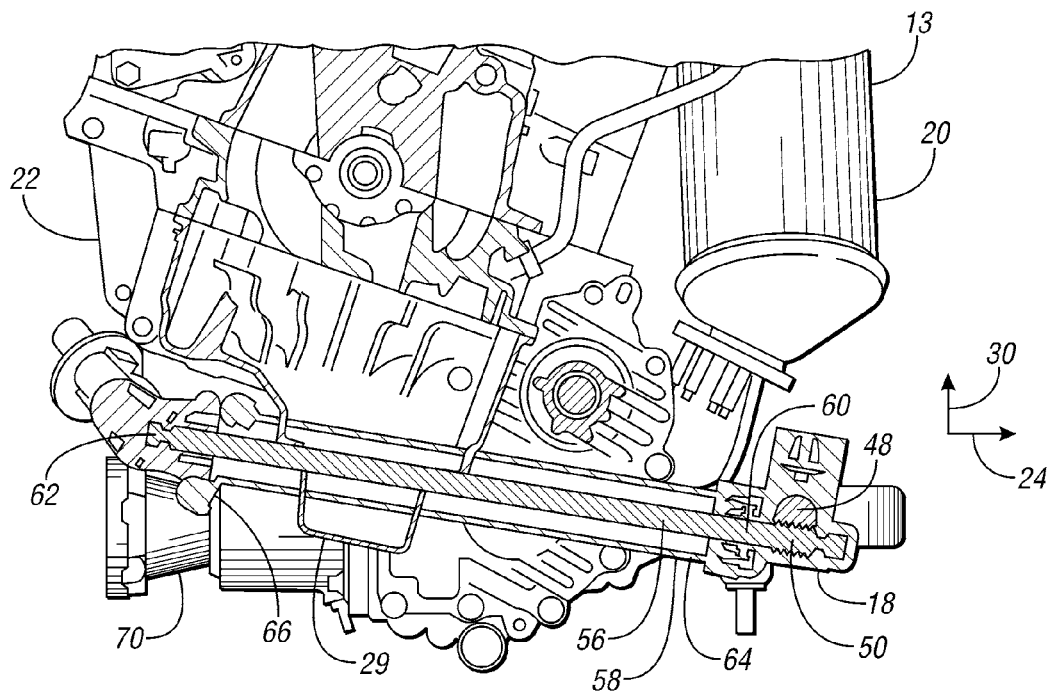
FIG. 3 is a schematic cut away view of a portion of the powertrain assembly shown in FIG. 1.

With reference to FIGS. 1-3, the powertrain assembly 12 further defines a first drive shaft 44, which may also be referred to as a first half shaft, and a second drive shaft 46, which may also be referred to as a second half shaft. The first drive shaft 44 is operatively coupled to a wheel, such as a front wheel. As such, the first drive shaft 44 is configured to transmit torque to that wheel. Similarly, the second drive shaft 46 is operatively coupled to another wheel, such as another front wheel. As such, the second drive shaft 46 is configured to transmit torque to that other wheel. Each of the first drive shaft 44 and the second drive shaft 46 is elongated along the third direction, which is indicated by arrow 36. In the depicted embodiment, the first drive shaft 44 and the second drive shaft 46 are operatively coupled to a respective front wheel and jointly define a drive shaft center S (FIG. 2). Further, the first drive shaft 44 and the second drive shaft 46 may define a drive shaft axis 72 (FIG. 1) that coincides with the drive shaft center S (FIG. 2).

In motor vehicles, it is important to minimize the space occupied by the powertrain assembly 12 in the vehicle 10. The distance X between the crankshaft center C and the drive shaft center S along the first direction indicated by arrow 24 may be minimized to reduce the overall width of the powertrain assembly 12, thereby enhancing the packaging of the vehicle 12.

In the depicted embodiment, the first drive shaft 44 and the second drive shaft 46 are closer to the first engine end 20 than to the second engine end 20, thereby maximizing the space in the vehicle dash and vehicle occupant compartment and minimizing the distance Y. As discussed above, it is desirable to minimize the distance Y to minimize the vehicle turning radius. The vehicle turning radius may also be referred to as the vehicle turning circle. The first drive shaft 44 and the second drive shaft 46 are also disposed closer to the fourth engine end 28 than to the third engine end 26. Thus, the drive shaft center S is closer to the fourth engine end 28 than to the third engine end 26. Moreover, the drive shaft center S is closer to the fourth engine end 28 than the crankshaft center C. Thus, the first drive shaft 44 and the second drive shaft 46 are closer to the fourth engine end 28 than the crankshaft center C.

The vehicle 10 further includes a steering assembly 16 configured to steer the vehicle 10. The steering assembly 16 is packaged in close proximity to the powertrain assembly 12 and includes a steering body 18 elongated along the third direction indicated by arrow 36. Specifically, the steering body 18 may be elongated along a steering body axis 74. The steering body 18 defines a first body end portion 38 and a second body end portion 40 opposite the first body end portion 38. The second body end portion 40 is spaced apart from the first body end portion 38 along the third direction, which is indicated by arrow 36.

The steering assembly 16 further includes a rack 48 and a pinion 50 both disposed within the steering body 18. The pinion 50 is configured to mesh with the rack 48. As such, rotating the pinion 50 causes the rack 48 to move longitudinally within the steering body 18. For example, rotating the pinion 50 may cause the rack 48 to move along the third direction indicated by arrow 36. The steering assembly 16 further includes a first rod 52 and a second rod 54 operatively coupled to the rack 48. The first rod 52 may be referred to as a tie rod and is coupled between a wheel (not shown) and the rack 48. Further, the first rod 52 and the second rod 54 may also be referred to as steering arms. The steering assembly 16 may include steering rod joints 76 at the end of each of the first rod 52 and the second rod 54. The steering rod joints 76 may also be referred to as steering arm joints. The steering rod joints 76 can operatively couple each of the first rod 52 and the second rod 54 to a wheel. The first rod 52 is configured to move longitudinally as the rack 48 moves longitudinally upon rotation of the pinion 50, thereby steering the wheel in a desired direction. Similarly, the second rod 54 is coupled between the rack 48 and another wheel (not shown). Consequently, the second rod 54 is configured to move longitudinally as the rack 48 moves longitudinally upon rotation of the pinion 50, thereby steering the wheel connected to the second rod 54 in a desired direction.

In motor vehicles, such as cars, it is desirable to minimize the turning radius. The turning radius refers to the smallest circle in which a vehicle can turn. To minimize the turning radius, it is important to optimize the vehicle wheelbase and a distance Y from the drive shaft center S to the steering rod joint 76 along the first direction indicated by arrow 24. For example, the wheelbase may be minimized to reduce the vehicle turning radius. However, from a customer and styling standpoint, it is desirable to maximize the wheelbase for a given overall vehicle length, which results in a larger vehicle turning circle. The powertrain and steering assembly layout disclosed herein allows vehicle manufacturers to lengthen the wheelbase of a vehicle with a transverse mounted engine and yet maintain or improve the vehicle turning circle. The presently disclosed powertrain and steering assembly layout allows the distance Y to be optimized such that the vehicle turning radius is minimized. Optimizing the distance Y may entail minimizing the distance Y. Minimizing the distance Y, however, has to be controlled because it may increase the steering effort required to turn the vehicle. The vehicle wheelbase refers to the distance between the centers of the front and rear wheels. The distance Y also corresponds to the distance from the drive shaft axis 72 to the steering body axis 74 along the first direction indicated by arrow 24. It is usually difficult to minimize the distance Y in a powertrain with the rack 48 located in front of the engine assembly 13. As discussed in detail below, by positioning a pinion shaft 56 of the steering assembly 16 under the engine 14 along with the unconventional engine position described in the present disclosure, the distance Y can be optimized (e.g., minimized), thus minimizing the vehicle turning radius. It is also desirable to maximize the space inside a vehicle dash (not shown) and a vehicle occupant compartment (not shown) in order to place more vehicle components closer to the first engine end 20.

The steering assembly 16 further includes a pinion shaft 56 rotationally coupled to the pinion 50. The pinion shaft 56 is disposed under the engine assembly 13. In operation, rotating the pinion shaft 56 causes the pinion 50 to rotate. In turn, the pinion shaft 56 is a rotationally coupled to a steering wheel (not shown). Thus, rotating the steering wheel causes the pinion shaft 56 to rotate. Upon rotation of the pinion shaft 56, the pinion 50 rotates, causing the rack 48 to move longitudinally. Further, the steering assembly 16 includes a shaft housing 58 surrounding the pinion shaft 56. The shaft housing 58 is substantially hollow and may be made of a substantially rigid material such as a metallic material.

The shaft housing 58 as well as the pinion shaft 56 are disposed closer to the fourth engine end 28 than to the third engine end 26. In the depicted embodiment, the shaft housing 58 and the pinion shaft 56 are disposed adjacent the fourth engine end 28 and the oil pan 29. In other words, at least a portion of the shaft housing 58 and the pinion shaft 56 may be disposed underneath the internal combustion engine 14. Further, the shaft housing 58 and the pinion shaft 56 are elongated substantially along the first direction as indicated by arrow 24. For example, the shaft housing 58 and the pinion shaft 56 can extend from the first engine end 20 to the second engine end 22 along the fourth engine end 28.

The pinion shaft 56 defines a first shaft end 60 and a second shaft end 62 opposite the first shaft end 60. The second shaft end 62 is spaced apart from the first shaft end 60 substantially along the first direction indicated by arrow 24. The first shaft end 60 is closer to the first engine end 20 than to the second engine end 22. The second shaft end 62 is closer to the second engine end 22 than to the first engine end 20.

The shaft housing 58 defines a first housing end 64 and a second housing end 66 opposite the first shaft housing end 64. The second housing end 66 is spaced apart from the first housing end 64 substantially along the first direction, which indicated by arrow 24. The first housing end 64 is closer to the first engine end 20 than to the second engine end 22. The second housing end 66 is closer to the second engine end 22 than to the first engine end 20.

The powertrain assembly 12 further includes an output torque shaft 70 operatively coupled to rear wheels (not shown) of the vehicle 10 to enable all wheel drive. The output torque shaft 70 may be positioned closer to the fourth or lower engine end 28 than to the third engine end 26. Further, the output torque shaft 70 may be positioned closer to the second engine end 22 than to the first engine end 20.

Figure 4:
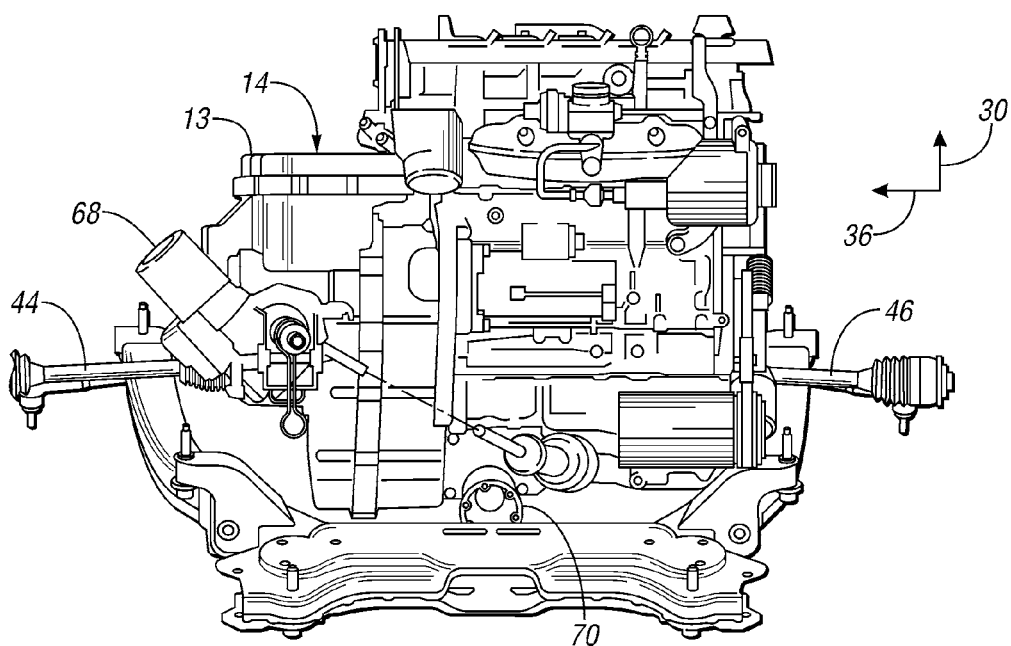
FIG. 4 is a schematic rear view of the powertrain assembly shown in FIG. 1.

With reference to FIG. 4, the steering assembly 16 may further include at least one power assist unit 68 coupled between the steering wheel (not shown) and the pinion shaft 56. The power assist unit 68 may be a motor and is configured to provide torque assist to the steering wheel and the steering assembly 16 to reduce the turning effort of the steering wheel by the driver as is well understood in the art. In the present disclosure, the power assist unit 68 is disposed adjacent the second shaft end 62. That is, the power assist unit 68 is not located inside the vehicle dash (not shown). Accordingly, there is more room inside the vehicle dash (not shown) for other components such as heating, ventilation, and air conditioning ducts. Also, because the power assist unit 68 is disposed adjacent the second shaft end 62, a joint (not shown) interconnecting the power assist unit 68 and a steering wheel shaft (not shown) can be located farther from the dash, thereby minimizing an angle defined between the steering wheel shaft and an output shaft of the power assist unit 68. Further, the power assist unit 68 may be wholly or partly made of a substantially rigid material so as to provide additional structural support to the powertrain assembly 12. The method may include positioning the steering assembly 16 in close proximity to engine assembly such that the steering body 18 is closer to the first engine end 20 than to the second engine end 22. The method may further include positioning the pinion shaft 56 closer to the fourth engine end 28 than to the third engine end 26.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:
1. A vehicle, comprising:
an engine assembly configured to power a vehicle, the engine assembly defining a first engine end and a second engine end opposite the first engine end, the first engine end spaced apart from the second engine end along a first direction, the engine assembly defining a third engine end and a fourth engine end opposite the third engine end, the third engine end being spaced apart from the fourth engine end along a second direction, the second direction being substantially perpendicular to the first direction;
a steering assembly disposed in close proximity to the engine assembly, the steering assembly including:
a steering body disposed closer to the first engine end than to the second engine end;
a rack disposed within the steering body, the rack being configured to move through the steering body along a third direction, the third direction being substantially perpendicular to the first direction and the second direction;
a pinion disposed within the steering body, the pinion being meshed with the rack such that the rack is configured to move longitudinally upon rotation of the pinion; and
a pinion shaft rotationally coupled to the pinion, the pinion shaft defining a first shaft end and a second shaft end opposite the first shaft end, the first shaft end being coupled to the pinion, the first shaft end being disposed closer to the first engine end than to the second engine end, and the second shaft end being disposed closer to the second engine end than to the first engine end.

2. The vehicle of claim 1, wherein the steering body is disposed closer to the fourth engine end than to the third engine end.

3. The vehicle of claim 1, wherein the pinion shaft extends from the first engine end to the second engine end.

4. The vehicle of claim 1, wherein the pinion shaft is disposed closer to the fourth engine end than to the third engine end.

5. The vehicle of claim 1, further comprising a drive shaft operatively coupled to the engine assembly, the drive shaft being disposed closer to the first engine end than to the second engine end.

6. The vehicle of claim 5, wherein the drive shaft is disposed closer to the fourth engine end than to the third engine end.

7. The vehicle of claim 6, wherein the engine assembly includes a crankshaft and the drive shaft is disposed closer to the fourth engine end than the crankshaft.

8. The vehicle of claim 7, wherein the crankshaft is disposed closer to the fourth engine end than to the third engine end.

9. The vehicle of claim 1, further comprising a power assist unit operatively coupled to the pinion shaft such that the power assist unit provides torque assist to the steering assembly.

10. The vehicle of claim 9, wherein the power assist unit is disposed adjacent the second shaft end.

11. A vehicle, comprising:
an engine assembly configured to power a vehicle, the engine assembly including a crankshaft and defining a first engine end and a second engine end opposite the first engine end, the first engine end spaced apart from the second engine end along a first direction, the engine assembly defining a third engine end and a fourth engine end opposite the third engine end, the third engine end being spaced apart from the fourth engine end along a second direction, the second direction being substantially perpendicular to the first direction;
a drive shaft operatively coupled to the engine assembly, the drive shaft being closer to the first engine end than to the second engine end; and
a steering assembly disposed in close proximity to the engine assembly, the steering assembly including a steering body elongated along a third direction, the third direction being substantially perpendicular to the first direction and the second direction, the steering body being closer to the first engine end than to the second engine end, wherein the steering assembly further includes:
a pinion disposed within the steering body; and
a pinion shaft rotationally coupled to the pinion, wherein the pinion shaft defines a first shaft end and a second shaft end opposite the first shaft end, the first shaft end is coupled to the pinion, and the second shaft end is closer to the second engine end than to the first engine end.

12. The vehicle of claim 11, wherein the steering assembly includes a rack disposed within the steering body, the rack being configured to move through the steering body along the third direction.

13. The vehicle of claim 12, wherein the pinion is meshed with the rack, and the pinion is configured to rotate such that the rack is configured to move longitudinally upon rotation of the pinion.

14. The vehicle of claim 13, wherein the pinion shaft is rotationally coupled to the pinion such that the pinion is configured to rotate upon rotation of the pinion shaft.

15. The vehicle of claim 14, wherein the pinion shaft is elongated substantially along the second direction.

16. The vehicle of claim 11, wherein the first shaft end is closer to the first engine end than the second engine end.

17. The vehicle of claim 16, wherein the pinion shaft is closer to the fourth engine end than to the third engine end.

18. The vehicle of claim 16, further comprising a power assist unit operatively coupled to the pinion shaft such that the power assist unit is configured to provide torque assist to the pinion shaft, wherein the power assist unit is disposed adjacent the second shaft end.

19. A method of manufacturing a vehicle, comprising:
providing an engine assembly configured to power a vehicle, the engine assembly defining a first engine end and a second engine end opposite the first engine end, the first engine end spaced apart from the second engine end along a first direction, the engine assembly defining a third engine end and a fourth engine end opposite the third engine end, the third engine end being spaced apart from the fourth engine end along a second direction, the second direction being substantially perpendicular to the first direction;
providing a steering assembly, the steering assembly including a steering body, a rack disposed within the steering body, a pinion meshed with the rack, and a pinion shaft coupled to the pinion;
positioning the steering assembly in close proximity to the steering assembly such that the steering body is closer to the first engine end than to the second engine end;
positioning the pinion shaft closer to the fourth engine end than to the third engine end, wherein the pinion shaft defines a first shaft end and a second shaft end opposite the first shaft end; and
positioning the second shaft end closer to the second engine end than to the first engine end.

* * * * *